(12) United States Patent
Eisert et al.

(10) Patent No.: US 7,511,397 B2
(45) Date of Patent: Mar. 31, 2009

(54) BRUSH SYSTEM FOR AN ELECTROMOTIVE DRIVE UNIT

(75) Inventors: Horst Eisert, Waldbüttelbrunn (DE); Robert Hessdörfer, Karlstadt-Stetten (DE)

(73) Assignee: Siemens Aktiengesellschaft, Munich (DE)

( * ) Notice: Subject to any disclaimer, the term of this patent is extended or adjusted under 35 U.S.C. 154(b) by 189 days.

(21) Appl. No.: 10/597,839

(22) PCT Filed: Jan. 20, 2005

(86) PCT No.: PCT/EP2005/050238

§ 371 (c)(1), (2), (4) Date: Aug. 9, 2006

(87) PCT Pub. No.: WO2005/078907

PCT Pub. Date: Aug. 25, 2005

(65) Prior Publication Data

US 2007/0159023 A1  Jul. 12, 2007

(30) Foreign Application Priority Data

Feb. 10, 2004  (DE) ......................... 10 2004 006 557

(51) Int. Cl.
*H02K 13/00* (2006.01)

(52) U.S. Cl. ............................. 310/239; 310/58; 310/59

(58) Field of Classification Search ................. 310/239, 310/68 R, 58, 59
See application file for complete search history.

(56) References Cited

U.S. PATENT DOCUMENTS

| | | | | |
|---|---|---|---|---|
| 3,299,303 A | * | 1/1967 | Newill et al. ................... 310/66 |
| 4,673,836 A | * | 6/1987 | Akiyama et al. ............. 310/239 |
| 4,758,816 A | * | 7/1988 | Blessing et al. .............. 338/314 |
| 4,896,067 A | * | 1/1990 | Walther ....................... 310/239 |
| 5,610,467 A | * | 3/1997 | Shiah et al. .................. 310/239 |
| 5,689,148 A | * | 11/1997 | Rubinchik ................... 310/239 |
| 5,821,662 A | * | 10/1998 | Kajino et al. ................ 310/239 |
| 5,949,173 A | * | 9/1999 | Wille et al. .................. 310/220 |
| 5,973,433 A | * | 10/1999 | Kiehnle et al. .............. 310/239 |
| 6,011,341 A | * | 1/2000 | Toya et al. ................... 310/239 |
| 6,525,439 B2 | * | 2/2003 | Whelan et al. ............. 310/68 R |
| 6,906,438 B2 | | 6/2005 | Ursel et al. .................... 310/89 |
| 2003/0107293 A1 | * | 6/2003 | Frey et al. .................... 310/239 |
| 2004/0012279 A1 | | 1/2004 | Ursel et al. .................... 310/75 |
| 2004/0084992 A1 | * | 5/2004 | Finkenbinder et al. ...... 310/239 |

FOREIGN PATENT DOCUMENTS

DE  760084  10/1955

(Continued)

OTHER PUBLICATIONS

International Search Report and Written Opinion for International Application No. PCT/EP2005/050238 (14 pages).

*Primary Examiner*—Burton Mullins
*Assistant Examiner*—Alex W Mok
(74) *Attorney, Agent, or Firm*—Baker Botts L.L.P.

(57) ABSTRACT

A brush system for an electric drive unit has a base to which brush system elements are fastened. Strip conductors via which required electrical connections are established are also provided on the base. Furthermore, a flat resistor that is disposed in a resistor housing is inserted into the brush system. The resistor housing is made of a thermally conductive material while being provided with air passage holes.

19 Claims, 3 Drawing Sheets

FOREIGN PATENT DOCUMENTS

| | | |
|---|---|---|
| DE | 2021374 A | 11/1970 |
| DE | 8030635 U1 * | 3/1981 |
| DE | 3301918 C2 | 10/1992 |
| DE | 29512310 U1 * | 12/1996 |
| DE | 19628471 A1 | 1/1997 |
| DE | 10129234 A1 | 2/2002 |
| EP | 258132 A1 * | 3/1988 |
| EP | 0363191 A2 | 4/1990 |
| EP | 0532224 B1 | 3/1998 |
| FR | 2763760 A1 | 11/1998 |
| FR | 2779585 A1 * | 12/1999 |
| FR | 2780578 A1 | 12/1999 |

* cited by examiner

BRUSH SYSTEM FOR AN ELECTROMOTIVE DRIVE UNIT

CROSS-REFERENCE TO RELATED APPLICATIONS

This application is a U.S. national stage application of International Application No. PCT/EP2005/050238 filed Jan. 20, 2005, which designates the United States of America, and claims priority to German application number DE 10 2004 006 557.8 filed Feb. 10, 2004, the contents of which are hereby incorporated by reference in their entirety.

TECHNICAL FIELD

The invention relates to a brush system for an electromotive drive unit and to an electromotive drive provided with a brush system of this kind.

BACKGROUND

In electromotive drives, stepped speed control is implemented using a resistor circuit. During operation, electrical energy is converted into thermal energy by said resistor circuit. This thermal energy may have a negative effect on the electromotive drive in respect of its service life. Overheating of the drive and increased drive component wear may occur. If the resistor circuit is disposed inside the motor, an air flow suitable for cooling cannot generally be guaranteed. This leads to an unwanted heat concentration in sections of the resistor circuit or in the drive as a whole, which may ultimately result in component failure.

To dissipate or remove the thermal energy produced, a known solution is to use cooling fins, large-area heatsinks or supplementary ventilation. Another known solution is to increase the service life by using more temperature-resistant, more durable and therefore more costly drive components.

DE 101 29 234 A1 discloses an electric drive unit comprising a gear housing, a motor housing, a separately implemented, watertight-sealed electronics housing, a brush holder and a signal receiver disposed on said brush holder. The brush holder is provided with plug contacts to which electronics provided in the electronics housing are electrically connected. In addition, the brush holder is fixed to the motor housing at the transition between the motor housing and the gear housing. No references to any kind of cooling measures are to be found in DE 101 29 234 A1.

SUMMARY

The object of the invention is to demonstrate a way of effectively removing heat energy created in an electromotive drive.

This object can be achieved by a brush system for an electromotive drive unit, comprising a base plate, brush system elements mounted on the base plate, conductors provided on or in the base plate and at least one electrical flat resistor enclosed in a resistor housing, said resistor housing being made of a thermally conductive material and provided with air passage openings.

The base plate may have an essentially discoidal shape and has a cut-out in its central area for accommodating the armature shaft with the commutator. The resistor housing can be disposed in the same plane as the base plate and can be inserted in another cut-out in the base plate. The resistor housing can be essentially disk-segment-shaped. The resistor housing may be connected to the base plate via snap-in connections. The flat resistor contained in the resistor housing may be connected via connecting lugs to the conductors of the base plate. The air passage openings may be bore—or slit-shaped perforations through the resistor housing. The resistor housing can be made of a light metal. The resistor housing may be provided with surface-enlarging extensions. The surface-enlarging extensions can be beads or flanges. The surface-enlarging extensions can be air flow deflecting elements. A surface-enlarging extension may be provided for contacting the resistor housing to the motor housing. The flat resistor can be a resistor foil, a meander-shaped flat resistor or a wire-shaped resistor. The resistor housing can be implemented in a gas-, liquid- and particle-tight manner. The resistor housing can be implemented in an open manner. An electromotive drive may have such a brush system.

The advantages of the invention are in particular that, through the incorporation of the resistor unit in the brush system and the special embodiment of the resistor unit as a flat resistor contained in a resistor housing provided with air passage openings, the air flow necessary for dissipating the thermal energy produced can be better ensured than with known drive systems. In addition, the flat implementation of the resistor unit and its incorporation in the brush system provides a compact, space saving design.

According to one embodiment, the brush system can be slid over the motor shaft and attached to the motor housing, thereby likewise ensuring a space saving design as well as reliable contact-making of the carbon brushes with the commutator segments of the electric motor.

According to further embodiments, a space saving disposition of the resistor unit in the brush system can be achieved with optimum adaptation of the resistor unit to the shape of the base plate of the brush system.

According to another embodiment, the resistor unit can be allowed to be quickly and easily inserted in the brush system.

According to another embodiment, the connecting lugs, which are each preferably inserted in an associated receiving pocket of the resistor housing, may provide a simple means of contact between the resistor circuit contained in the resistor housing and an associated conductor on the base plate of the brush system.

According to another embodiment, the air passage openings can be holes or slits. These can advantageously be ready-made in the resistor housing during the resistor unit manufacturing process, care obviously having to be taken to ensure that the resistor circuit provided inside the resistor housing is not damaged.

If the resistor housing is made of aluminum, according to another embodiment, or some other light metal, the entire brush system can be of lightweight construction.

According to further embodiments, there can be advantageously achieved an increase in the total surface area of the resistor housing available for heat dissipation.

The air flow deflecting elements according to another embodiment allow selective guidance of the air stream so as to enable heat to be effectively removed from strongly heat generating components and also to prevent removed heat from being conducted in the immediate direction of heat-sensitive components.

The resistor circuit contained in the resistor housing can be a resistor film, a meander-shaped flat resistor or a resistor wire installed in a meandering manner.

The gas-, liquid- and particle-tight implementation of the resistor housing according to another embodiment has the advantage that the components inside the housing are protected from corrosion and other damage caused by gases, liquids or particles present in the engine compartment.

An embodiment of the resistor housing allows an escape of gases, liquids or more precisely moisture and particles which have penetrated the resistor housing in an undesirable manner during the production and use of the resistor unit.

BRIEF DESCRIPTION OF THE DRAWINGS

Further advantageous characteristics of the invention will emerge from their exemplary explanation with reference to the accompanying drawings in which.

DETAILED DESCRIPTION

Figure 1:
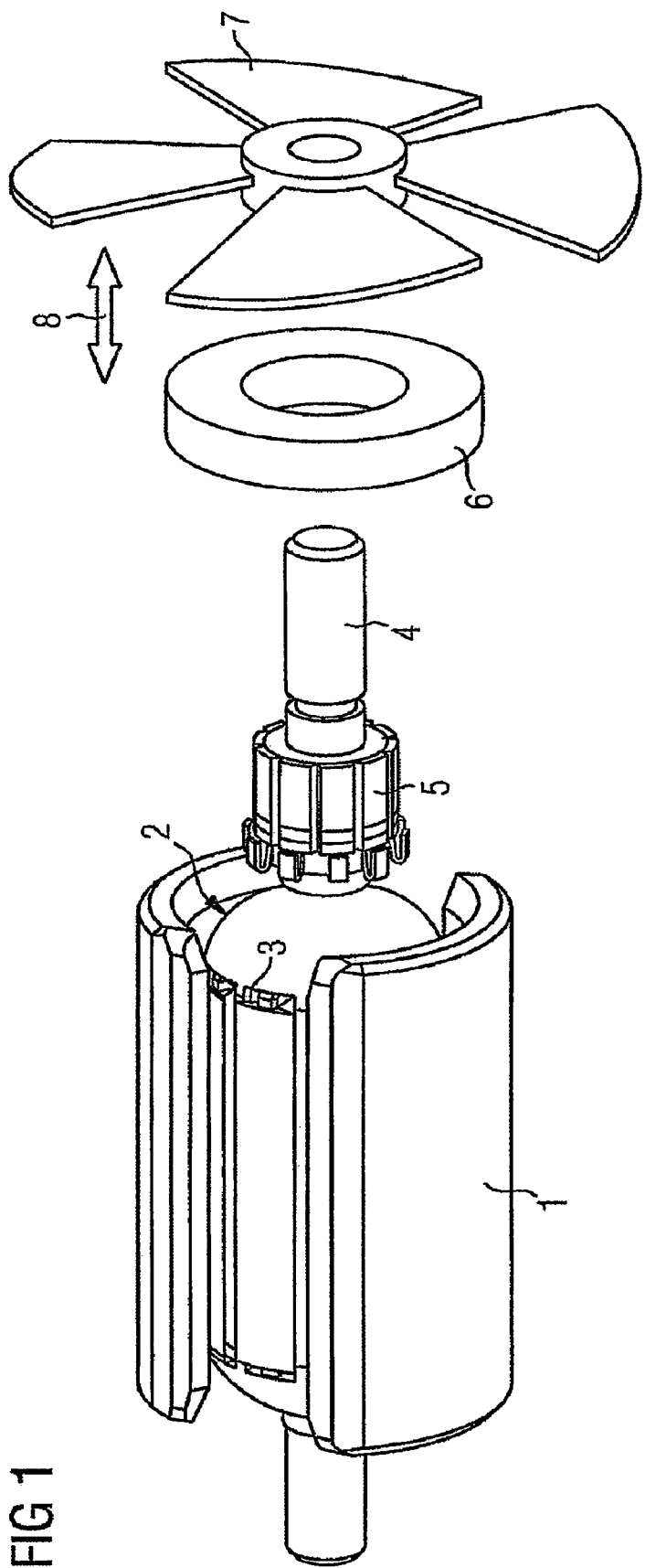
FIG. 1 shows a schematic view of the electromotive drive components essential for understanding the invention.

FIG. 1 shows a schematic view of the electromotive drive components essential for understanding the invention. An electromotive drive of this kind has a motor housing (not shown) in which permanent magnets 1 are disposed. The motor housing and the permanent magnets constitute a stator. In addition, the electromotive drive contains an armature 2 on which coils 3 are provided. The armature 2 also comprises an armature shaft 4 on which a commutator with commutator segments 5 is mounted, said commutator segments being electrically connected to the windings of the coils 3.

The electromotive drive illustrated additionally has a brush system 6 which, in the assembled state of the drive, is positioned around the shaft 4 in such a way that it is immediately adjacent to the commutator segments. When installed, this brush system 6 is fixed to the motor housing.

In addition, in the installed state of the drive, the armature shaft 1 is mechanically coupled to a fan wheel 7 and drives same. The fan wheel 7 is so designed that, when it rotates with the shaft 4, air flows in the direction indicated by the arrow 8, i.e. essentially parallel to the shaft 4 of the electromotive drive.

By means of a special embodiment of the brush system 6, which will be explained in greater detail below with reference to FIGS. 2-4, it is ensured that at least part of the air flow produced by the fan wheel 7 effectively removes the heat energy generated from the motor.

Figure 2:
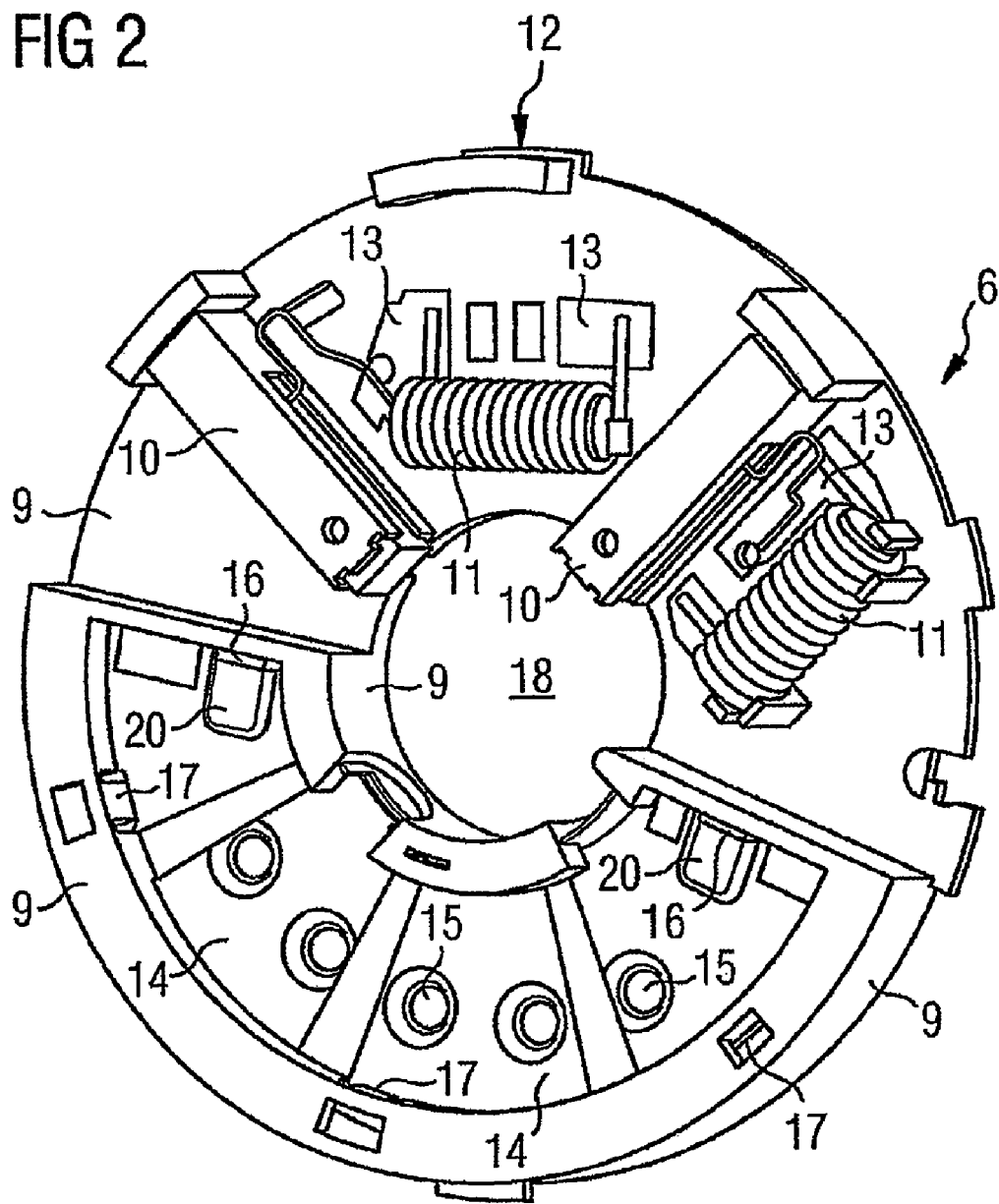
FIG. 2 shows a more detailed schematic view of the brush system 6 of system 1.

FIG. 2 shows a more detailed schematic view of the brush system 6 of FIG. 1. The brush system 6 illustrated has a base plate 9 made of a non-electrically conductive material such as bakelized paper or plastic. The base plate 9 has an essentially discoidal, preferably circular discoidal basic shape and is provided with a cut-out 18 in its central area.

On the base plate 9 are mounted brush holder support elements 10 which are implemented e.g. as brush yokes. Inside these brush holder support elements 10 are mounted the carbon brushes which, in the operating state, make contact with the commutator segments 5. Also mounted on the base plate 9 are interference suppression elements such as chokes 11 and capacitors. On the base plate 9 there is additionally provided a mating connector 12 via which the brush system can be electrically contacted to an external voltage supply. The necessary electrical connections of the components mounted on the base plate 9 between one another and to other components are established via conductors 13 provided on the base plate. These conductors can be implemented in the form of a leadframe stamped from a metal sheet, as a circuit board or as individual conductor tracks either injected into the base plate or subsequently mounted on same. Hereinafter it will be assumed that the conductors are implemented as conductor tracks.

According to the present invention there is incorporated in the brush system 6 a resistor unit having a resistor housing 14 and, provided in said resistor housing, a flat resistor arrangement hereinafter referred to as a flat resistor. Said flat resistor is a resistor foil, a meander-shaped flat resistor or a resistor wire disposed in a meandering manner as shown for example in FIG. 3 with reference symbol 20. This flat resistor is used as part of stepped speed control of the electromotive drive.

The resistor housing 14 has an essentially discoidal, preferably disk-segment-shaped basic form and consists of a light metal, preferably aluminum. This allows the entire brush system to be of lightweight design.

Figure 3:
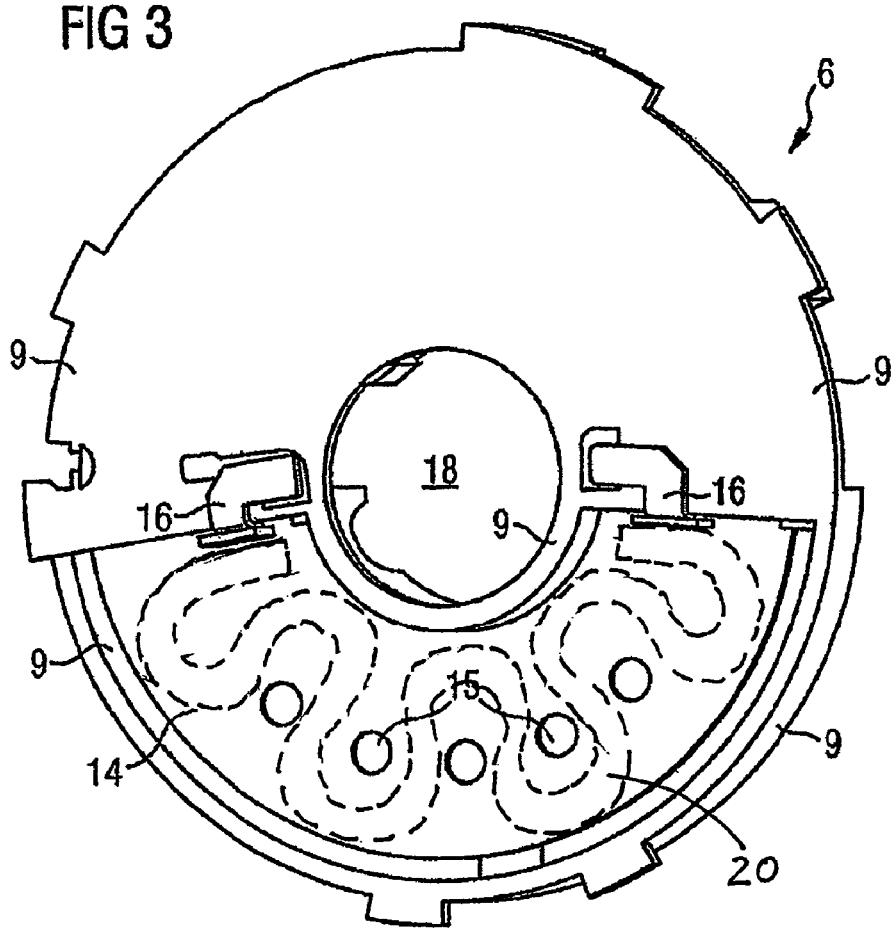
FIG. 3 shows a schematic rear view of the brush system 6 illustrated in FIG. 2

As shown in FIGS. 2 and 3, the resistor housing 14 is an integral part of the brush system 6. The resistor housing 14 is disposed in the same plane as the base plate 9 and is inserted in a form-fit manner in another, preferably disk-segment-shaped cut-out in the base plate 9. The resistor housing 14 is attached to the base plate 9 by means of snap-in connections 17 into which the resistor housing is snapped after its insertion. The resistor housing is inserted in the cut-out in the base plate from the underside of the base plate.

The necessary electrical contacting of the terminals of the flat resistor disposed in the resistor housing 14 is effected using connecting lugs 16 which are pushed into the receiving pockets 20 of the resistor housing 14. The connecting lugs 16 connect the terminals of the flat resistor to one of the conductor tracks 13 in each case. For example, one of the conductor tracks connects one terminal to an external power supply cable plugged into a contact of the connector 12 of the brush system 6. In addition, another of the conductor tracks 13 connects the other terminal of the flat resistor to one of the carbon brushes via one of the interference suppression elements 11.

In order to be able to ensure good aeration and therefore good heat dissipation, the resistor housing 14 has a plurality of air passage openings 15. These can be holes or slits ready-made in the housing during manufacture of the resistor unit 14. The more aeration is required, the larger the number of air passage openings can be. Alternatively or additionally, the size of the air passage openings can also be varied.

Considering FIGS. 1 and 2 in conjunction, it is apparent that the air passage openings 15 are disposed in such a way that they allow the unrestricted passage of the air flow caused by the rotation of the fan wheel 7, thereby effectively dissipating the heat generated by the resistor unit.

Effective removal of the heat produced by the resistor unit is also assisted by the large-area, thermally conductive housing 14 which passes heat generated within the resistor housing to ambient.

In order to improve the heat dissipation still further, the resistor housing 14 is preferably provided with surface-enlarging extensions such as beads or flanges. In addition, these surface-enlarging extensions can also be air flow deflecting elements.

Figure 4:
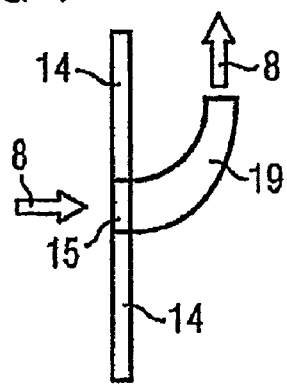
FIG. 4 shows a schematic view for explaining a development of the invention.

An example of an air flow deflecting element of this kind is illustrated in FIG. 4. This is a sectional view showing one of the holes 15 and the parts of the resistor housing 14 above and below the hole. In addition, the arrows 8 indicate the air flow direction. It can be seen that the air directed through the hole 15 in the resistor housing is diverted by the air flow deflecting element 19 and has a different flow direction on leaving the air flow deflecting element. By using air flow deflecting elements of this kind, the flow direction of the air can be influenced, making it possible to direct more heat-dissipating air into areas containing components which generate a large amount heat.

A surface-enlarging extension of the resistor housing 14 can also advantageously connect the resistor housing to the housing of the motor. Consequently, heat is also dissipated via the motor housing, a measure which also counteracts overheating of the drive unit.

According to one embodiment of the invention, the resistor housing can be made gas-, liquid- and particle-tight. This has the advantage of preventing gases, liquids or particles present, for example, in the engine compartment of a motor vehicle in which the drive unit is located from damaging the components contained in the housing during operation of the drive unit. In particular, this prevents corrosion from occurring.

According to another embodiment of the invention, the resistor housing can also be implemented in an open manner. This open design of the resistor housing has the advantage that gases, liquids or more precisely moisture and particles which get into the resistor housing during the production process and during operational use in an undesirable manner are also easily removed from it again.

The invention thus relates to a brush system which can be used in an electromotive drive. The brush system has a base plate, brush holder support elements mounted on said base plate and interference suppression elements. Additionally provided on the base plate are conductors via which the necessary electrical connections are established. The resistor unit containing a flat resistor disposed in a resistor housing is inserted in the base plate, fixed to same and placed in contact with the conductors. The resistor housing has air passage openings which facilitate an air flow caused by the rotation of a fan wheel. By means of this air flow, generated heat, particularly heat produced during the operation of the flat resistor, is dissipated in an effective manner.

What is claimed is:

1. A brush system for an electromotive drive unit, comprising:
   a base plate having openings,
   brush system elements mounted on the base plate,
   conductors provided on or in the base plate and
   at least one electrical flat resistor enclosed in a resistor housing, said resistor housing being made of a thermally conductive material and provided with air passage openings and wherein said resistor housing is coupled with said base plate such that said openings of said base plate are aligned with said air passage openings.

2. A brush system according to claim 1, wherein the base plate has an essentially discoidal shape and has a cut-out in its central area for accommodating the armature shaft with the commutator.

3. A brush system according to claim 1, wherein the resistor housing is disposed in the same plane as the base plate and is inserted in another cut-out in the base plate.

4. A brush system according to claim 3, wherein the resistor housing is essentially disk-segment-shaped.

5. A brush system according to claim 1, wherein the resistor housing is connected to the base plate via snap-in connections.

6. A brush system according to claim 1, wherein the flat resistor contained in the resistor housing is connected via connecting lugs to the conductors of the base plate.

7. A brush system according to claim 1, wherein the air passage openings are bore- or slit-shaped perforations through the resistor housing.

8. A brush system according to claim 1, wherein the resistor housing is made of a light metal.

9. A brush system according to claim 1, wherein the resistor housing is provided with surface-enlarging extensions.

10. A brush system according to claim 9, wherein the surface-enlarging extensions are air flow deflecting elements.

11. A brush system according to claim 9, wherein a surface-enlarging extension is provided for contacting the resistor housing to the motor housing.

12. A brush system according to claim 1, wherein the flat resistor is a resistor foil, a meander-shaped flat resistor or a wire-shaped resistor.

13. A brush system according to claim 1, wherein the resistor housing is implemented in a gas-, liquid- and particle-tight manner.

14. A brush system according to claim 1, wherein the resistor housing is implemented in an open manner.

15. An electromotive drive having a brush system according to claim 1.

16. A brush system according to claim 1, wherein the brush system elements are brush holder supports.

17. A brush system for an electromotive drive unit, comprising:
   a base plate,
   brush system elements mounted on the base plate,
   conductors provided on or in the base plate and
   at least one electrical flat resistor enclosed in a resistor housing, said resistor housing being made of a thermally conductive material and provided with first air passage openings,
   wherein the base plate has an essentially discoidal shape and has a cut-out in its central area for accommodating the armature shaft with the commutator and second air passage openings aligned with said first air passage openings, and wherein the resistor housing is disposed in the same plane as the base plate and is inserted in another cut-out in the base plate.

18. A brush system according to claim 17, wherein the resistor housing is essentially disk-segment-shaped.

19. A brush system according to claim 17, wherein the resistor housing is connected to the base plate via snap-in connections.

* * * * *